(12) United States Patent
Taguchi

(10) Patent No.: US 9,914,480 B2
(45) Date of Patent: Mar. 13, 2018

(54) VEHICLE FRONT STRUCTURE

(71) Applicant: HONDA MOTOR CO., LTD., Tokyo (JP)

(72) Inventor: Yuki Taguchi, Woko (JP)

(73) Assignee: HONDA MOTOR CO., LTD., Tokyo (JP)

( * ) Notice: Subject to any disclaimer, the term of this patent is extended or adjusted under 35 U.S.C. 154(b) by 202 days.

(21) Appl. No.: 14/837,703

(22) Filed: Aug. 27, 2015

(65) Prior Publication Data

US 2017/0057547 A1 Mar. 2, 2017
US 2017/0217495 A9 Aug. 3, 2017

(30) Foreign Application Priority Data

Aug. 28, 2014 (JP) .................................. 2014-174197

(51) Int. Cl.
*B62D 21/15* (2006.01)
*B62D 21/11* (2006.01)

(52) U.S. Cl.
CPC ............ *B62D 21/152* (2013.01); *B62D 21/11* (2013.01); *B62D 21/155* (2013.01)

(58) Field of Classification Search
CPC ..... B62D 21/152; B62D 21/11; B62D 21/155

USPC ..................................................... 296/187.09
See application file for complete search history.

(56) References Cited

U.S. PATENT DOCUMENTS 7,213,873 B2 * 5/2007 Murata ................... B62D 21/11
296/187.09
8,851,520 B2 * 10/2014 Goellner .............. B62D 21/155
280/784

FOREIGN PATENT DOCUMENTS

JP 2005-271810 A 10/2005

* cited by examiner

*Primary Examiner* — Joseph D. Pape
*Assistant Examiner* — Dana D Ivey
(74) *Attorney, Agent, or Firm* — Westerman, Hattori, Daniels & Adrian, LLP

(57) ABSTRACT

A vehicle front structure includes a cross member installed across right and left front side frames. The left front side frame has a frame bending section provided above a left suspension arm. The frame bending section is formed so as to be bendable when subjected to a frontal impact load. A left reinforcing member is disposed below the frame bending section and is mounted across the cross member and the dash cross member. The left reinforcing member is fastened to a rear fastening portion. The left reinforcing member has a bending section that is bendable downward when subjected to an impact load.

7 Claims, 10 Drawing Sheets

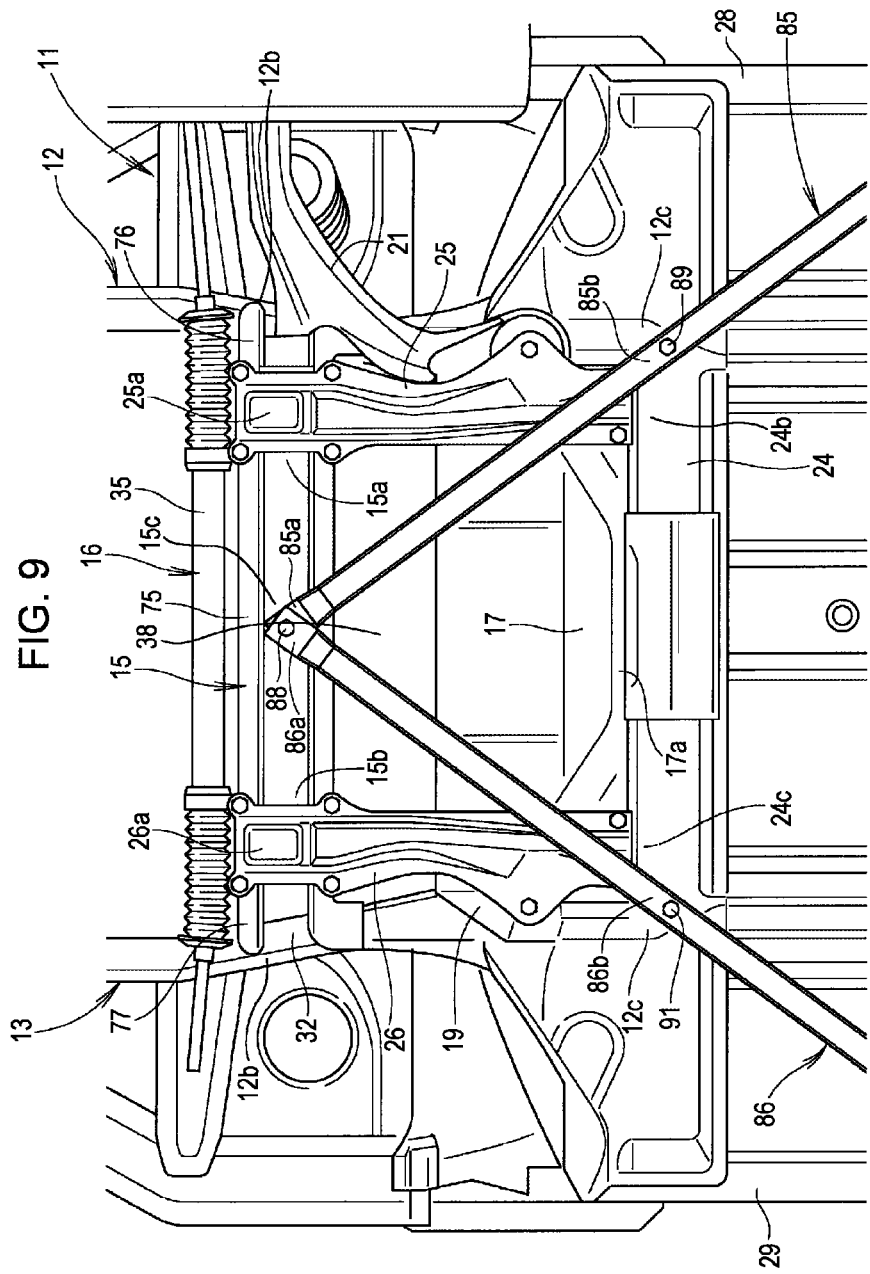

VEHICLE FRONT STRUCTURE

CROSS REFERENCES TO RELATED APPLICATIONS

The present application claims priority under 35 U.S.C. § 119 to Japanese Patent Application No. 2014-174197, filed Aug. 28, 2014, entitled "VEHICLE FRONT STRUCTURE". The contents of this application are incorporated herein by reference in their entirety.

BACKGROUND

1. Field

The present disclosure relates to a vehicle front structure that has front side frames provided on right and left sides thereof and suspension arms supported below the front side frames.

2. Description of the Related Art

Some vehicle front structures have subframes provided below right and left front side frames and have engines or other power sources supported by the subframes. A subframe is a highly rigid member that supports an engine or other power source. When subjected to a frontal impact load, such a highly rigid subframe bends, thereby absorbing the impact load (see, for example, Japanese Unexamined Patent Application Publication No. 2005-271810).

Some vehicle front structures, however, have no subframes. In other words, they have a Γ (gamma in uppercase) shaped or A shaped lower arm for independent suspension directly supported by the vehicle body with no subframe therebetween. Such vehicle front structures are not capable of absorbing a frontal impact load through subframes. In addition, such a highly rigid Γ (gamma in uppercase) shaped or A shaped lower arm, when subjected to an impact load, does not collapse in a preferred manner. This arrangement may impede the absorption of a frontal impact load through the deformation of front side frames.

SUMMARY

The present application describes a vehicle front structure capable of absorbing a frontal impact load in a preferred manner.

According to a first aspect of the embodiment, a vehicle front structure includes front side frames provided on right and left sides of a vehicle body, a cross member mounted across the front side frames, a dash panel provided behind the cross member, a mount provided on the side of the dash panel, and front and rear side support portions of a suspension arm fastened to the cross member and the mount, respectively, in which the front side frames has a frame bending section (shaped as a portion capable of bending by an external force given in its longitudinal direction) that is provided above the suspension arm and is bendable when subjected to a frontal impact load, i.e., a collision impact force applied thereto generally in a longitudinal direction; a reinforcing member is provided that is disposed below the frame bending section across the cross member and the mount so as to extend longitudinally and be fastened to the rear side support portion; and the reinforcing member has a bending section (shaped as a portion capable of bending by an external force given in its longitudinal direction) that is bendable downward when subjected to the impact load. When a frontal impact load causes the frame bending section of the front side frame to be bent, the bending section of the reinforcing member is bent downward. With this arrangement, the reinforcing member is unlikely to suppress rearward bending of the front side frame. Accordingly, the front side frame can be bent rearward in a preferred manner, thereby allowing the impact load coming from a vehicle front to be absorbed appropriately. The reinforcing member is fastened to the rear fastening portion of the suspension arm (for example, a Γ (gamma in uppercase) shaped or A shaped lower arm). When the bending section of the reinforcing member is bent downward, the reinforcing member exerts a downward and rearward load on the rear side support portion. This enables the mount attached to the rear side support portion to be fractured or enables the rear side support portion to be detached from the mount. Accordingly, the suspension arm is unlikely to suppress rearward bending of the front side frame, thereby allowing the impact load coming from a vehicle front to be absorbed in a more preferred manner. Furthermore, fastening the reinforcing member to the rear side support portion of the suspension arm enables the rear side support portion to be supported by the reinforcing member. This arrangement ensures that the rear side support portion is tightly mounted on the mount, thereby allowing the rear side support portion (namely, the suspension arm) to be supported in a more preferred manner.

According to a second aspect of the embodiment, the rear side support portion may have an elastic portion (elastic member) provided in a main arm of the suspension arm and a collar extending vertically in the elastic portion, in which a fastening component inserted through the collar from below may be fastened to the mount. In other words, the collar is supported so as to be tilt-adjustable through elastic deformation of the elastic portion and is supported at one side by the mount. When a frontal impact load causes the frame bending section of the front side frame to be bent, the front side support portion is moved rearward together with the cross member. In conjunction with the movement of the front side support portion, the main arm is moved rearward, pressing the collar rearward via the elastic portion. When the elastic portion is subjected to the elastic deformation, the collar is slanted to form a downward gradient toward the rear of the vehicle. This facilitates the fracture or deformation of the mount fastened to the rear side support portion, thereby allowing the rear side support portion to be detached from the mount in a preferred manner. This process accelerates rearward bending of the front side frame, thereby allowing the impact load coming from a vehicle front to be absorbed in a more preferred manner.

According to a third aspect of the embodiment, the reinforcing member may have a rigid section that extends longitudinally between front and rear ends of the reinforcing member and that is bendable downward at the bending section, in which the rear side support portion may be disposed between the bending section and the rear end of the reinforcing member. With this arrangement, the bending section is located frontward as compared to the rear side support portion. Accordingly, a frontal impact load causes the bending section to be bent downward in a preferred manner. This enables the downward and rearward impact load to be exerted on the rear side support portion through the reinforcing member in a preferred manner, thereby allowing the rear reinforcing member to appropriately detach from the mount.

According to a fourth aspect of the embodiment, the reinforcing member may have a substantially flat plate section formed in a belt-like outer shape and a bead section that widens downward from the plate section so as to form the rigid section, in which the plate section is fastened to the rear side support portion. The plate section is disposed higher than the bead section. Accordingly, fastening the plate section to the rear side support portion ensures that a minimum ground clearance is maintained. In addition, the plate section is substantially flat, which maintains a clearance between the plate section and the rear side support portion at a preferred level. With this arrangement, when the elastic portion is subjected to elastic deformation, the plate section is unlikely to suppress the movement of the rear side support portion, ensuring the operation of the suspension arm during vehicle operation.

According to a fifth aspect of the embodiment, the cross member may have a leg that extends upward to the front side frame and may be opened toward the outside of the vehicle in a vehicle width direction so as to house the front side support portion, in which the front side support portion housed in the leg may be fastened to the leg and the reinforcing member may be fastened to the cross member on an inboard side of the leg. With this arrangement, the cross member and the front side frame ensure the rigidity of the leg. Fastening the front side support portion to the leg enables the front side support portion to be tightly supported by the leg. In addition, the reinforcing member is allowed to be disposed on the inboard side of the leg (namely, the front side support portion). As described above, the leg is opened toward the outside of the vehicle in the width direction and the reinforcing member is disposed on the inboard side of the front side support portion, which enables the suspension arm to be moved vertically. This arrangement ensures that the suspension arm is moved vertically during vehicle operation.

According to a sixth aspect of the embodiment, the mount may be provided on the front side frame, and a dash cross member mounted across the front side frames may be provided behind the mount, in which the rear end of the reinforcing member may be provided in the dash cross member. With this arrangement, the front side frame ensures the rigidity of the mount, thereby allowing the design of the mount rigid enough to support the rear side support portion (namely, the suspension arm). In addition, the highly rigid dash cross member can support the rear end of the reinforcing member. This enables the rear end of the reinforcing member to be tightly supported, facilitating the downward bending of the reinforcing member in a preferred manner.

According to a seventh aspect of the embodiment, the cross member may have a steering unit mounted on a top of the cross member, in which the reinforcing member may be fastened to the cross member so as to be located below the steering unit. With this arrangement, the reinforcing member can reinforce a portion where the steering unit is mounted, thereby tightly supporting the steering unit on top of the cross member.

According to an eighth aspect of the embodiment, the cross member and the front side frames, or the cross member and the dash cross member may be connected to each other with right and left braces, in which the right and left braces may diverge toward a rear of the vehicle substantially in a V-shape. With this arrangement, the cross member and the front side frames can be reinforced by the right and left braces, or the cross member and the dash cross member can be reinforced by the right and left braces. The steering unit and the front side support portion of the suspension arm are supported by the cross member. In addition, the rear side support portion of the suspension arm is supported by the front side frames. Furthermore, the dash cross member is mounted across the right and left front side frames. This arrangement can improve the rigidity (so called "support rigidity") of the members that support the power steering unit and other steering system components and the suspension arm, thereby allowing various members to be tightly supported by the vehicle body.

BRIEF DESCRIPTION OF THE DRAWINGS

FIG. 9 is an enlarged view of right and left braces in FIG. 1.

DESCRIPTION OF THE PREFERRED EMBODIMENTS

A preferred embodiment according to the present disclosure is described below with reference to the attached drawings. References to a "front (Fr)" side, a "rear (Rr)" side, a "left (L)" side, and a "right (R)" side of the vehicle are defined relative to a driver's position, where the vehicle has a longitudinal, front-to-rear (which includes Fr to Rr or Rr to Fr) direction generally perpendicular to a vehicle width direction (which includes R to L or L to R).

EMBODIMENT

Figure 1:
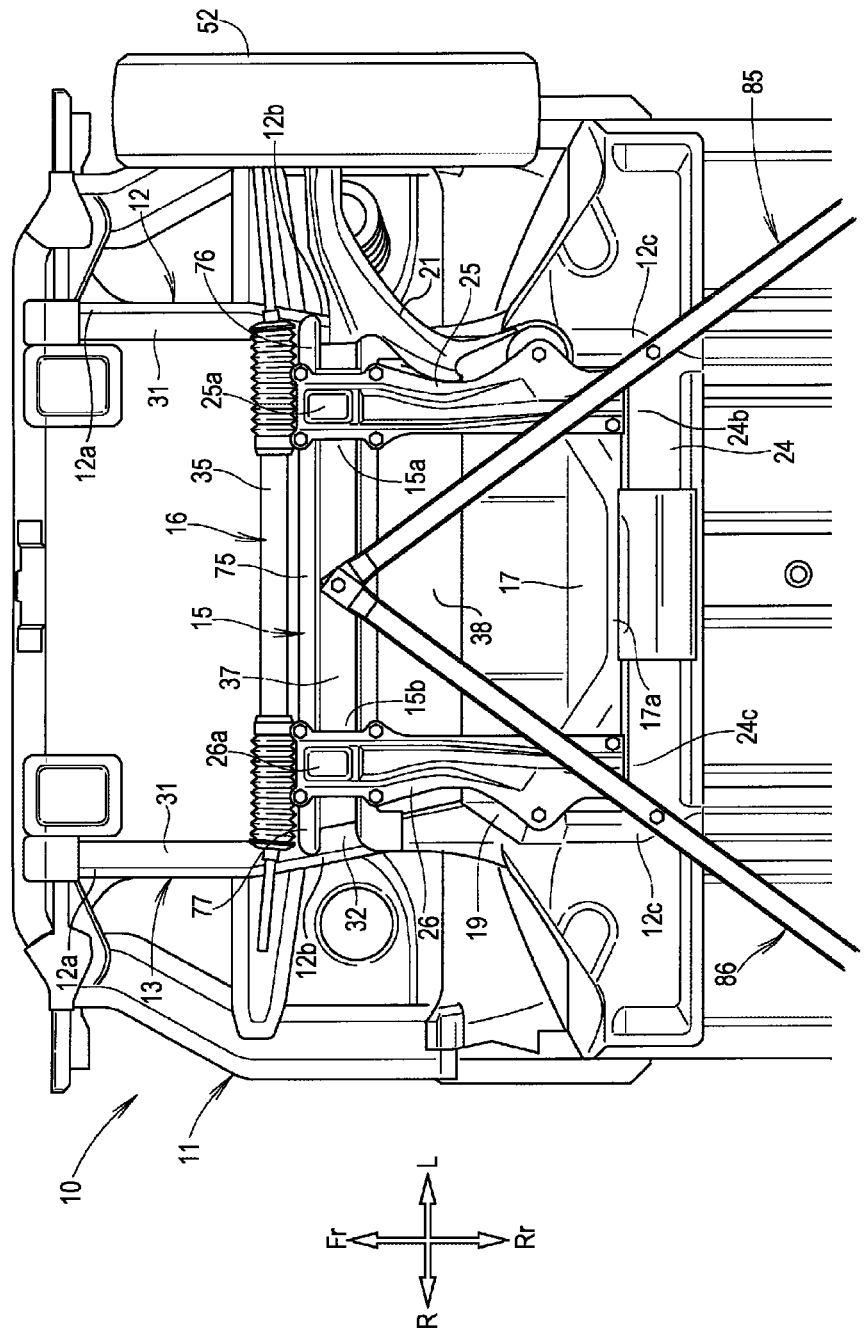
FIG. 1 is a bottom view of a vehicle front structure according to the present application.
Figure 2:
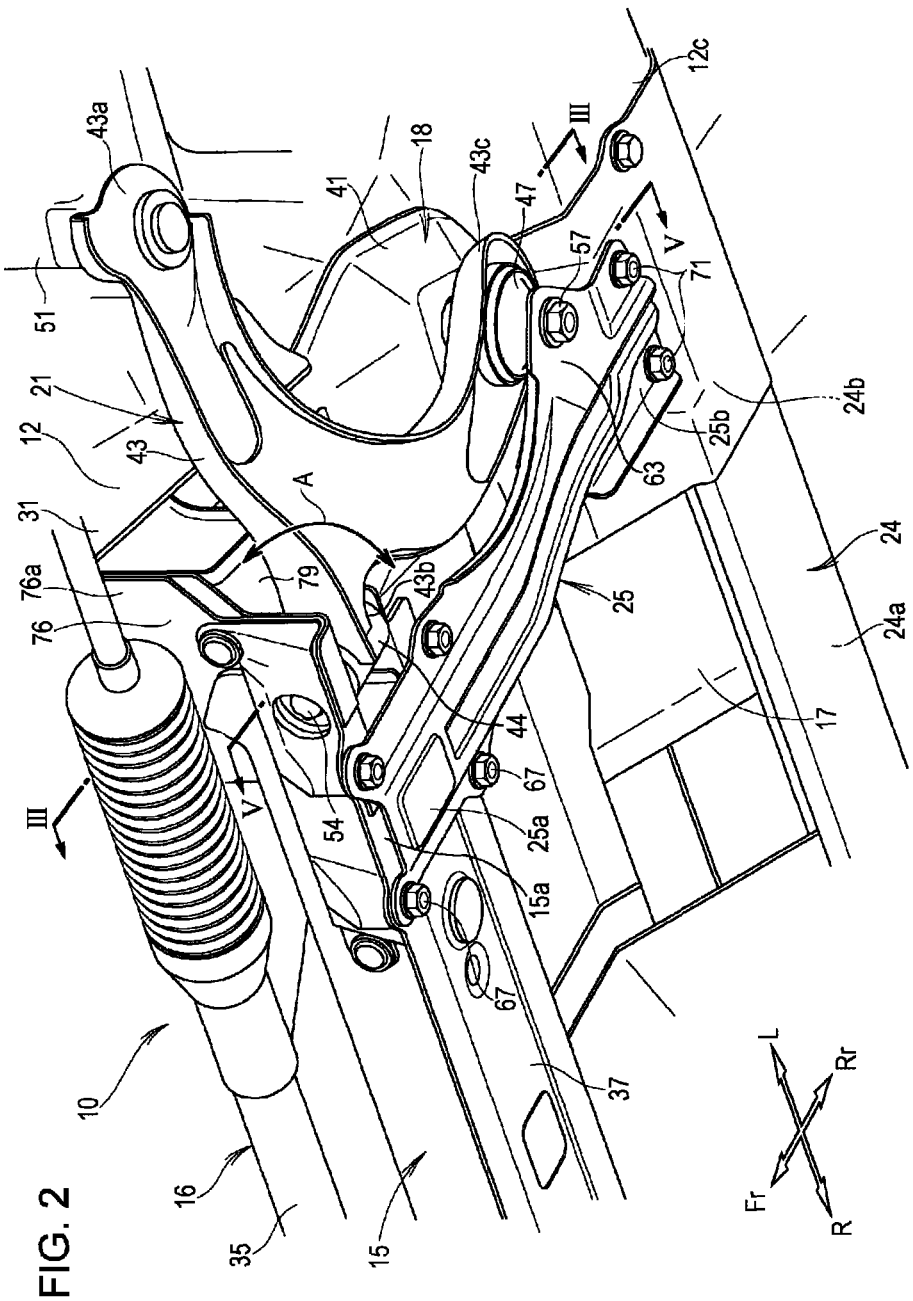
FIG. 2 is a perspective view of a vehicle front structure illustrated in FIG. 1 as viewed from the obliquely forward bottom.

A vehicle front structure 10 according to an embodiment is described below. As illustrated in FIGS. 1 and 2, the vehicle front structure 10 has right and left front side frames 12 and 13 provided respectively on the right and left sides of a vehicle body 11, a cross member 15 installed across the right and left front side frames 12 and 13, and a power steering unit 16 provided along the cross member 15.

In addition, the vehicle front structure 10 has a dash panel 17 behind the cross member 15, a left mount 18 provided on the left front side frame 12 on the side of the dash panel 17, and a right mount 19 provided on the right front side frame 13 on the side of the dash panel 17.

Furthermore, the vehicle front structure 10 has a left suspension arm 21 supported by the cross member 15 and the left mount 18, a right suspension arm (not illustrated) supported by the cross member 15 and the right mount 19, a dash cross member 24 installed across the left front side frame 12 and the right front side frame 13, and right and left reinforcing members 25 and 26 installed across the cross member 15 and the dash cross member 24. The right and left suspension arms 21 are a Γ (gamma in uppercase) shaped or A shaped lower arm for use in an independent suspension device.

Figure 3:
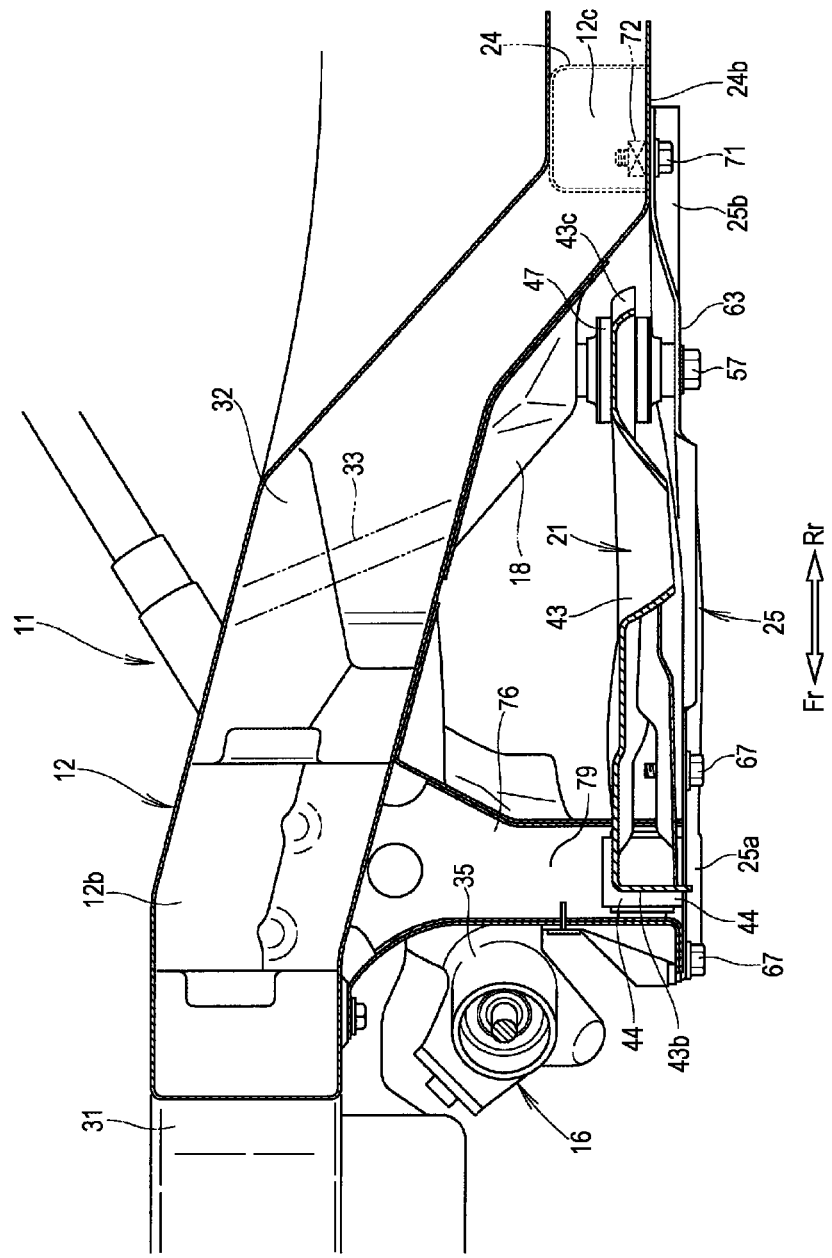
FIG. 3 is a sectional view taken along the line III-III in FIG. 2.

As illustrated in FIG. 3, the left front side frame 12 is disposed longitudinally on the left side of the vehicle body 11. The left front side frame 12 has a front section 31 extending substantially horizontally from a front end 12a (see FIG. 1) to a nearly middle section 12b and a rear slanted section 32 extending downward from the nearly middle section 12b to a rear end 12c. A frame bending section 33 is formed in the rear slanted section 32 of the left front side frame 12 so as to be located above the left suspension arm 21. The frame bending section 33 is configured to be transversely bendable when subjected to a frontal impact load.

As illustrated in FIG. 1, like the left front side frame 12, the right front side frame 13 also has a front section 31 and a rear slanted section 32 and has a frame bending section 33 (not illustrated) formed in the rear slanted section 32. The left front side frame 12 and the right front side frame 13 are symmetrical with respect to each other, and since the same reference numerals and symbols refer to the same components, detailed descriptions of the right front side frame 13 are omitted.

The cross member 15 is mounted across the nearly middle section 12b of the left front side frame 12 and the nearly middle section 12b of the right front side frame 13. The cross member 15 extends transversely and a steering tube 35 of the power steering unit 16 is provided along the cross member 15. The cross member 15 has a left mounting portion 15a formed at a left end in a base 37 thereof and has a right mounting portion 15b at a right end.

The dash cross member 24 is mounted across the rear end 12c of the left front side frame 12 and the rear end 12c of the right front side frame 13. The dash cross member 24 extends transversely and has a lower portion 17a of the dash panel 17 formed thereon. The dash panel 17 is a plate-like member that is provided in the rear of an engine compartment 38 so as to provide a partition between the engine compartment 38 and the passenger compartment.

Figure 4:
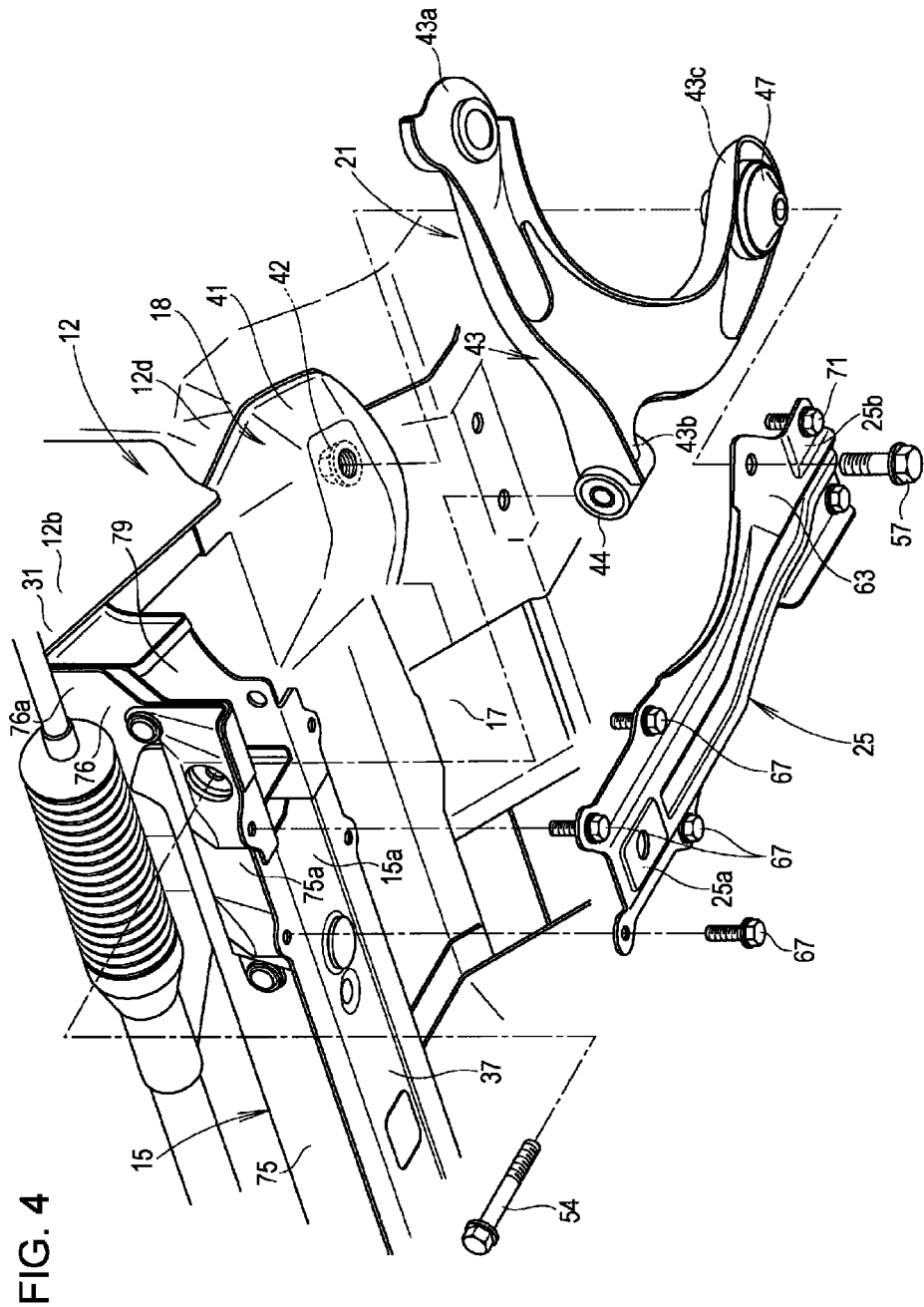
FIG. 4 is an exploded perspective view of a vehicle front structure illustrated in FIG. 2.
Figure 5:
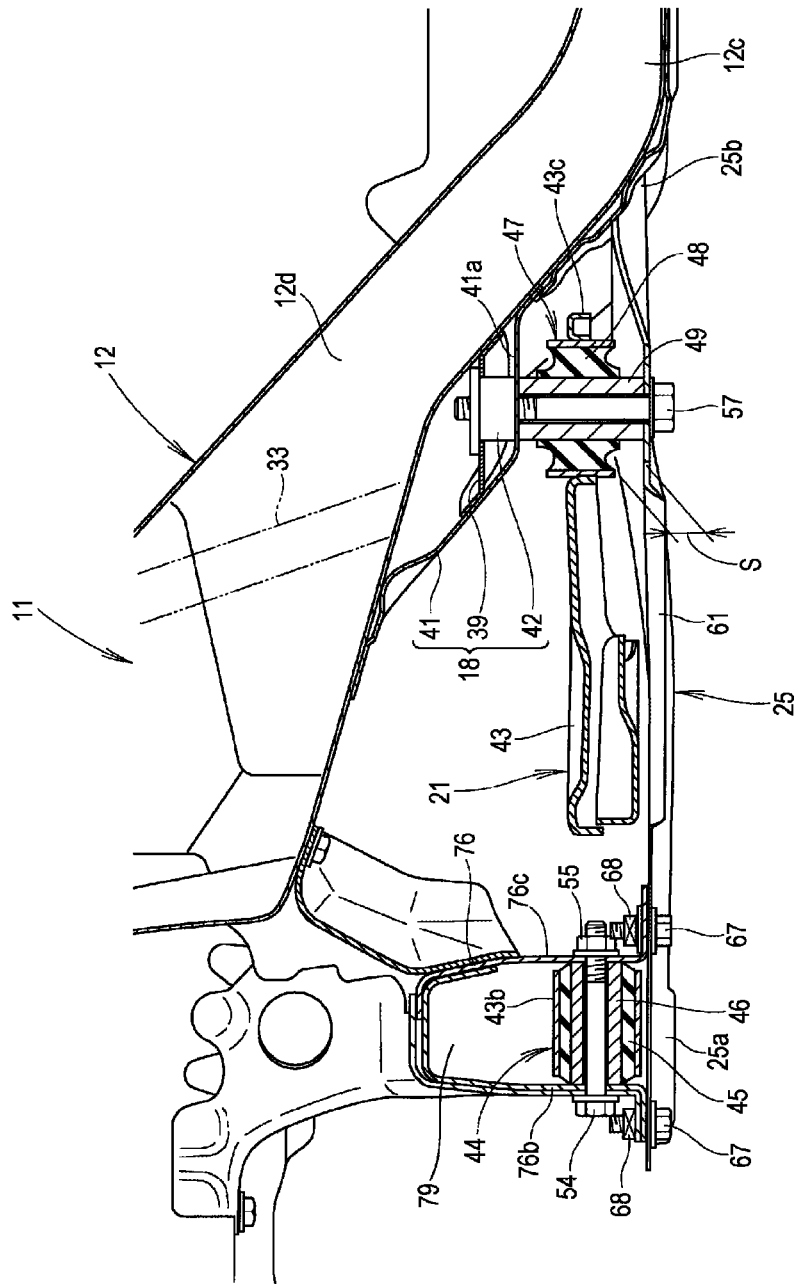
FIG. 5 is a sectional view taken along the line V-V in FIG. 2.

As illustrated in FIGS. 4 and 5, the left front side frame 12 has the left mount 18 disposed under a section 12d thereof on the side of the dash panel 17. The left mount 18 has a bracket 41 extending downward from the section 12d of the left front side frame 12 on the side of the dash panel 17, a gusset 39 provided inside the bracket 41, and a rear fastening nut 42 provided at a bottom 41a of the bracket 41.

A rear side support portion 47 of the left suspension arm 21 is fastened to the left mount 18, while a front side support portion 44 of the left suspension arm 21 is fastened to a left leg 76 of the cross member 15. Accordingly, the left suspension arm 21 is supported by the left leg 76 of the cross member 15 and the left mount 18. The left mount 18 is provided in the section 12d of the left front side frame 12 on the side of the dash panel 17. With this arrangement, the left front side frame 12 ensures the rigidity of the left mount 18, thereby enabling the rear side support portion 47 (namely, the left suspension arm 21) to be supported by the left mount 18 in a preferred manner.

As illustrated in FIG. 2, the left suspension arm 21 has a main arm 43 having a connecting portion 43a connected to a lower portion of a knuckle 51, the front side support portion 44 provided at a front end 43b of the main arm 43, and the rear side support portion 47 at a rear end 43c of the main arm 43. A front wheel 52 is installed onto the knuckle 51 (see FIG. 1).

As illustrated in FIGS. 4 and 5, the front side support portion 44 has an elastic portion 45 provided at the front end 43b of the main arm 43 and a collar 46 provided at the elastic portion 45. The collar 46 extends longitudinally and has its front and rear ends in contact with the left leg 76 of the cross member 15. The collar 46 is mounted on the front end 43b of the main arm 43 with the elastic portion 45 therebetween.

A front fastening bolt (fastening component) 54 is passed through the collar 46 and fastened with the front fastening nut 55, thereby causing the front side support portion 44 to be fastened to the left leg 76 of the cross member 15. With this arrangement, the front side support portion 44 is housed in a space 79 in the left leg 76. Accordingly, the front side support portion 44 is moved rearward together with the left leg 76 of the cross member 15.

The rear side support portion 47 has an elastic portion 48 provided at the rear end 43c of the main arm 43 and a collar 49 provided at the elastic portion 48. The collar 49 is disposed so as to extend vertically and is mounted on the rear end 43c of the main arm 43 with the elastic portion 48 therebetween. A rear fastening bolt (fastening component) 57 is passed from below through the collar 49 and fastened with the rear fastening nut 42, thereby causing the rear side support portion 47 to be fastened to the left mount 18. In other words, the collar 49 is supported so as to be tilt-adjustable through elastic deformation of the elastic portion 48 and is supported at one side by the left mount 18.

The left mount 18 and the right mount 19 (see FIG. 1) are symmetrical with respect to each other, and detailed descriptions of the right mount 19 are omitted. In addition, the left suspension arm 21 and the right suspension arm are symmetrical with respect to each other, and detailed descriptions of the right suspension arm are omitted.

As illustrated in FIG. 2, the dash cross member 24 is provided behind the left mount 18 and the right mount 19 (see FIG. 1). The dash cross member 24 has a left mounting portion (a mounting portion behind the mount) 24b formed at a left end in a base 24a thereof and has a right mounting portion (a mounting portion behind the mount) 24c at a right end.

In other words, the left mounting portion 24b is formed at the left end of the dash cross member 24, while the right mounting portion 24c is formed at the right end of the dash cross member 24. As a result, the dash cross member 24 ensures that the left mounting portion 24b and the right mounting portion 24c are rigid. The left reinforcing member 25 is installed across the left mounting portion 24b of the dash cross member 24 and the left mounting portion 15a of the cross member 15. With this arrangement, the left reinforcing member 25 is disposed lower than the frame bending section 33 (see FIG. 3) of the left front side frame 12.

As illustrated in FIG. 1, the right reinforcing member 26 is installed across the right mounting portion 24c of the dash cross member 24 and the right mounting portion 15b of the cross member 15. With this arrangement, the right reinforcing member 26 is disposed lower than the frame bending section (not illustrated) of the right front side frame 13. The left reinforcing member 25 and the right reinforcing member 26 are symmetrical with respect to each other, and detailed descriptions of the right reinforcing member 26 are omitted.

Figure 6:
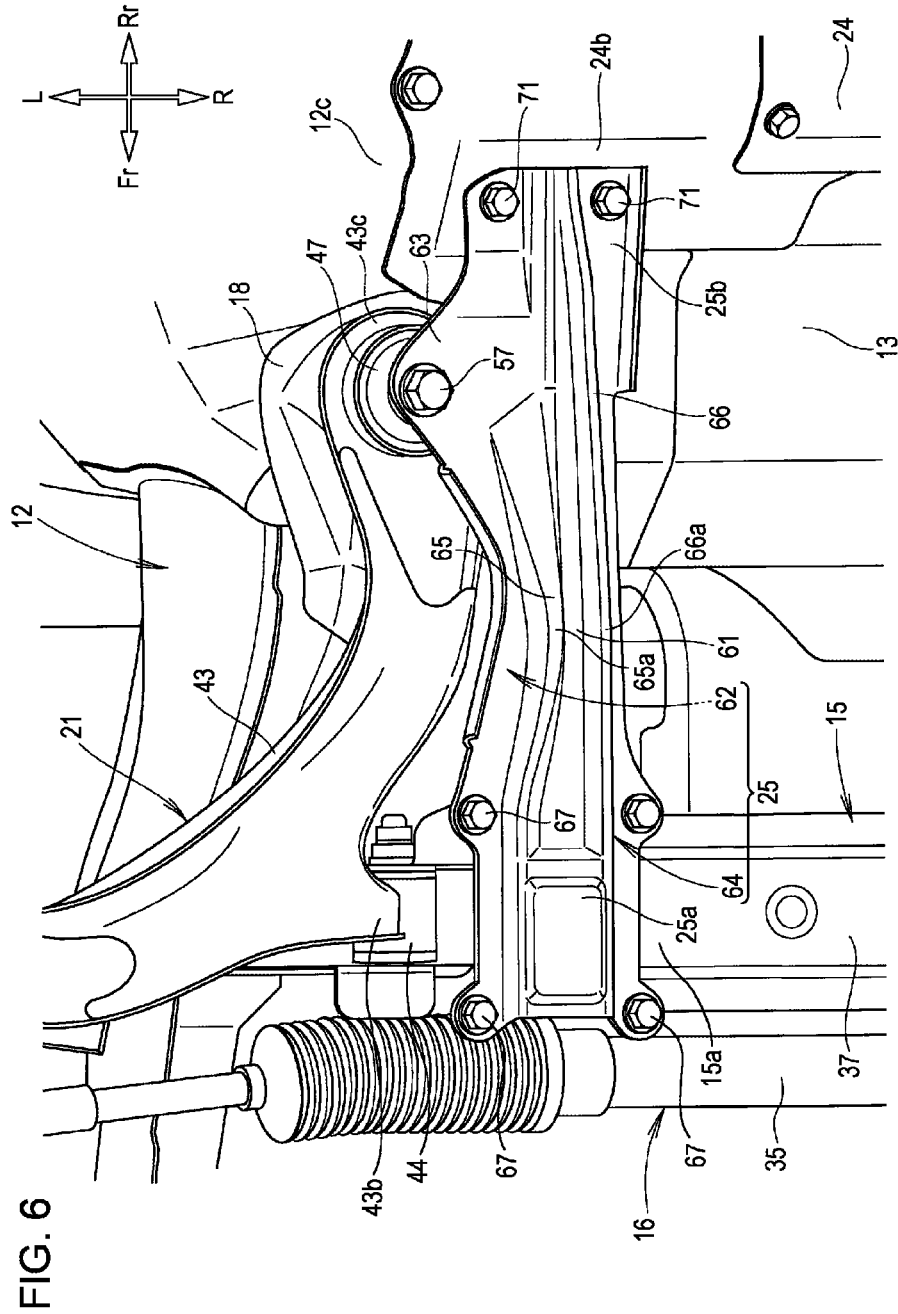
FIG. 6 is a perspective view of a left reinforcing member illustrated in FIG. 2 as viewed from the bottom.

As illustrated in FIGS. 5 and 6, the left reinforcing member 25 is installed across the left mounting portion 24b of the dash cross member 24 and the left mounting portion 15a of the cross member 15 so as to extend longitudinally. The left reinforcing member 25 has a bending section (a bendable portion) 61 formed at a substantially middle section thereof in a longitudinal direction. When the vehicle body 11 is subjected to a frontal impact load, the bending section 61 bends in response to the impact load.

The left reinforcing member 25 is formed by press-forming of, for example, a steel sheet and has a substantially flat plate section 62 formed in a belt-like outer shape and a rigid section 64 widening downward from the plate section 62. The plate section 62 is fastened at its front end to the left mounting portion 15a of the cross member 15 from below with a plurality of bolts 67 and nuts 68. Accordingly, a front end 25a of the left reinforcing member 25 is fastened to the left mounting portion 15a of the cross member 15.

In addition, the plate section 62 is fastened at its rear end to the left mounting portion 24b of the dash cross member 24 from below with a plurality of bolts 71 and nuts 72 (see FIG. 3). Accordingly, a rear end 25b of the left reinforcing member 25 is fastened to the left mounting portion 24b of the dash cross member 24. The dash cross member 24 is a highly rigid member that forms the framework of the vehicle body. Accordingly, the rear end 25b of the left reinforcing member 25 is tightly supported by the left mounting portion 24b of the dash cross member 24. When the vehicle body 11 is subjected to a frontal impact load, this arrangement facilitates bending of the bending section 61 in response to the impact load.

As illustrated in FIG. 2, the front end 25a of the left reinforcing member 25 is fastened to the left mounting portion 15a of the cross member 15, and the rear end 25b of the left reinforcing member 25 is fastened to the left mounting portion 24b of the dash cross member 24, thereby causing the left reinforcing member 25 to be installed across the left mounting portion 15a and the left mounting portion 24b. Accordingly, the cross member 15 (particularly, the left leg 76 of the cross member 15) and the dash cross member 24 are reinforced by the left reinforcing member 25. The left leg 76 of the cross member 15 supports the front side support portion 44 of the left suspension arm 21. With this arrangement, the front side support portion 44 of the left suspension arm 21 can be supported by the left leg 76 of the cross member 15.

As illustrated in FIGS. 5 and 6, the plate section 62 has a rear support 63 close to the rear end. The rear support 63 protrudes toward the outside of the vehicle in the vehicle width direction from the vicinity of the rear end of the plate section 62. The rear support 63 is in contact with the rear side support portion 47 of the left suspension arm 21 so as to underlie the rear side support portion 47. The rear side support portion 47 of the left suspension arm 21 is in contact with the left mount 18 so as to underlie the left mount 18. With this arrangement, the rear fastening bolt 57 is inserted into the rear side support portion 47 through the rear support 63 and fastened with the rear fastening nut 42 in the left mount 18. Accordingly, the rear side support portion 47 and the rear support 63 are fastened to the left mount 18 from below.

In other words, the rear support 63 is fastened to the rear side support portion 47 from below with the rear fastening bolt 57 and the rear fastening nut 42. With this arrangement, the rear side support portion 47 is disposed between the bending section 61 and the left mounting portion 24b of the dash cross member 24. The rear side support portion 47 and the rear support 63 fastened to the left mount 18 from below enables the rear side support portion 47 to be supported by the rear support 63 (namely, the left reinforcing member 25). This arrangement can keep the rear side support portion 47 tightly mounted on the left mount 18, enabling the rear side support portion 47 (namely, the left suspension arm 21) to be supported in a preferred manner.

The rigid section 64 widens downward from the plate section 62. The rigid section 64 extends longitudinally between the front end 25a and the rear end 25b of the left reinforcing member 25. The rigid section 64 has a first bead section 65 formed so as to extend toward the outside of the vehicle in the vehicle width direction and has a second bead section 66 formed on the inboard side of the first bead section 65 so as to extend in the vehicle width direction. The first bead section 65 extends longitudinally from the front end 25a to the rear support 63 of the reinforcing member 25 and widens downward. The second bead section 66 extends longitudinally from the front end 25a to the rear end 25b of the reinforcing member 25 and widens downward.

The left reinforcing member 25 has a front end of the plate section 62 fastened to the left mounting portion 15a of the cross member 15 with a plurality of bolts 67 and nuts 68. Also, the left reinforcing member 25 has a rear end of the plate section 62 fastened to the left mounting portion 24b of the dash cross member 24 with a plurality of bolts 71 and nuts 72 (see FIG. 3). In addition, the rear support 63 of the plate section 62 is fastened to the rear side support portion 47. The plate section 62 is disposed higher than the first bead section 65 and the second bead section 66. Accordingly, fastening the plate section 62 to the left mounting portion 15a of the cross member 15, the left mounting portion 24b of the dash cross member 24, and the rear side support portion 47 enables the heads of the bolts 67, the bolts 71, and the rear fastening bolt 57 to be located higher, ensuring that a minimum ground clearance is maintained.

In addition, the plate section 62 is substantially flat, which enables a clearance S to be maintained between the plate section 62 and the rear side support portion 47 at preferred levels. With this arrangement, when the elastic portion 48 of the rear side support portion 47 is subjected to elastic deformation, the plate section 62 is unlikely to suppress the movement of the rear side support portion 47. In other words, this arrangement ensures the movement of the left suspension arm 21 during vehicle operation and the operation of the left suspension arm 21.

The left reinforcing member 25 has the first bead section 65 and the second bead section 66 widening downward and has bead bending portions 65a and 66a of the first bead section 65 and the second bead section 66 widening so as to be bent downward. Accordingly, the rigid section 64 is bendable downward at the bending section 61. In other words, when the vehicle body 11 is subjected to a frontal impact load, the left reinforcing member 25 is configured to be bent downward at the bending section 61 due to the impact load.

The rear side support portion 47 is disposed between the bending section 61 and the left mounting portion 24b of the dash cross member 24. In other words, the bending section 61 is located frontward as compared to the rear side support portion 47. Accordingly, subjecting the vehicle body 11 to an impact load causes the bending section 61 of the left reinforcing member 25 to be bent downward, thereby enabling such a downward and rearward impact load to act on the rear side support portion 47 through the rear support 63 of the left reinforcing member 25 in a preferred manner. The downward and rearward impact load acting on the rear reinforcing member 47 enables the rear reinforcing member 47 to appropriately detach from the left mount 18.

Figure 7:
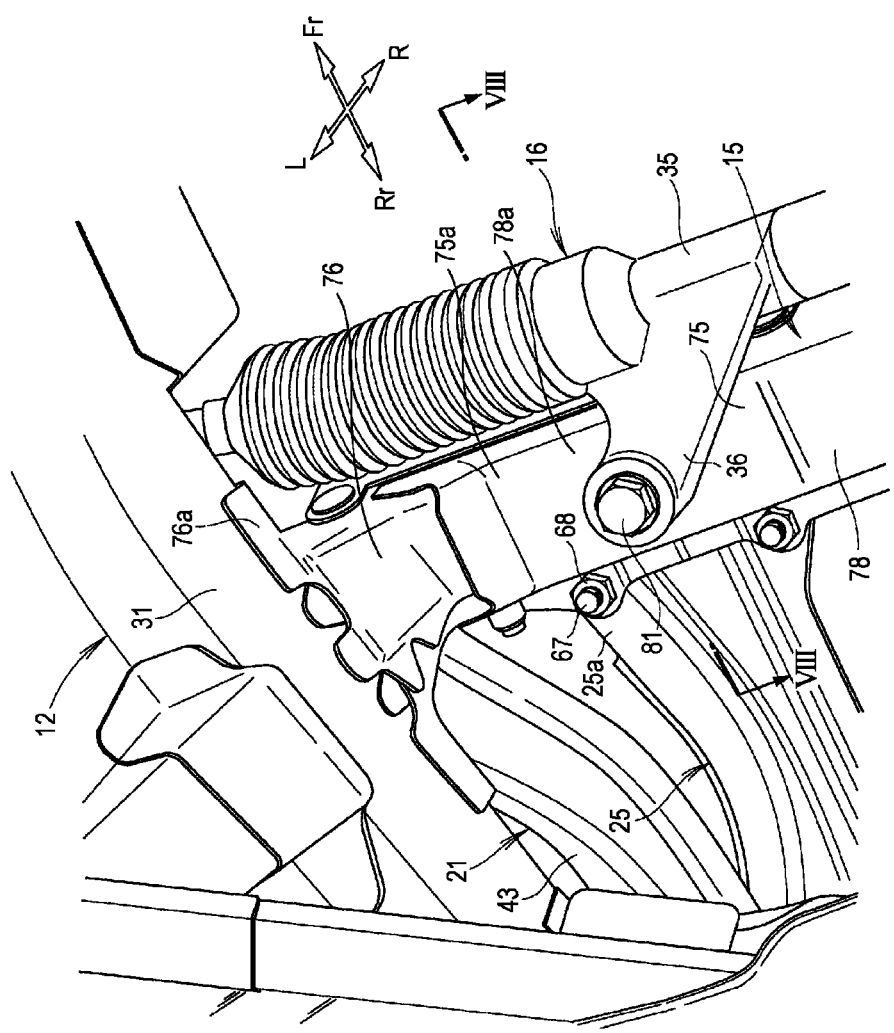
FIG. 7 is a perspective view of a cross member and a power steering unit illustrated in FIG. 2 as viewed from the top.

As illustrated in FIGS. 4 and 7, the cross member 15 has a main member 75 extending in the vehicle width direction, the left leg 76 provided at a left end 75a of the main member 75, and a right leg 77 (see FIG. 1) provided at a right end of the main member 75. Also, the cross member 15 has the left mounting portion 15a on which the front end 25a of the left mounting portion 25 is mounted and the right mounting portion 15b (see FIG. 1) on which the front end 26a of the right mounting portion 26 is mounted. The left mounting portion 15a of the cross member 15 is a portion on the bottom 37 of the cross member 15 that is located at a left end of the bottom 37. The left leg 76 and the right leg 77 are members that are provided in a symmetrical arrangement, and detailed descriptions of the right leg 77 are omitted.

The left leg 76 extends upward from the left end 75a of the main member 75 to the front section 31 of the left front side frame 12 and has its upper end 76a connected to the front section 31. Accordingly, the left end 75a of the main member 75 and the front section 31 of the left front side frame 12 ensure that the left leg 76 is rigid. Fastening the front side support portion 44 to the rigid left leg 76 enables the front side support portion 44 to be rigidly supported by the left leg 76. The left leg 76 has a space 79 that opens toward the outside of the vehicle in the width direction so as to be directed downward. The space 79 is formed to be able to house the front side support portion 44 through its opening.

As illustrated in FIG. 5, with the front side support portion 44 housed in the space 79, the front side support portion 44 is fastened to a front wall 76b and a rear wall 76c of the left leg 76 with a front fastening bolt 54 and a front fastening nut 55. The front side support portion 44 is supported so as to be vertically rotatable around the front fastening bolt 54.

As illustrated in FIGS. 2 and 4, the front end 25a of the left reinforcing member 25 is fastened from below to the left mounting portion 15a of the cross member 15 with the plurality of bolts 67 and nuts 68 (see FIG. 5 for the nuts). The left mounting portion 15a of the cross member 15 is disposed on the inboard side of the left leg 76. Accordingly, the front end 25a of the left reinforcing member 25 is disposed on the inboard side of the front side support portion 44.

As described above, the left leg 76 is opened toward the outside of the vehicle in the width direction so as to be directed downward and the front end 25a of the left reinforcing member 25 is disposed on the inboard side of the front side support portion 44. Accordingly, the left suspension arm 21 is allowed to be moved vertically (in a direction indicated by an arrow) around the front fastening bolt 54. This ensures that the left suspension arm 21 is moved vertically during vehicle operation.

As illustrated in FIGS. 1 and 7, the steering tube 35 of the power steering unit 16 is provided on the front side of the cross member 15 so as to run along the cross member 15. The steering tube 35 has right and left mounting brackets 36 (right bracket not illustrated) at right and left ends thereof.

Figure 8:
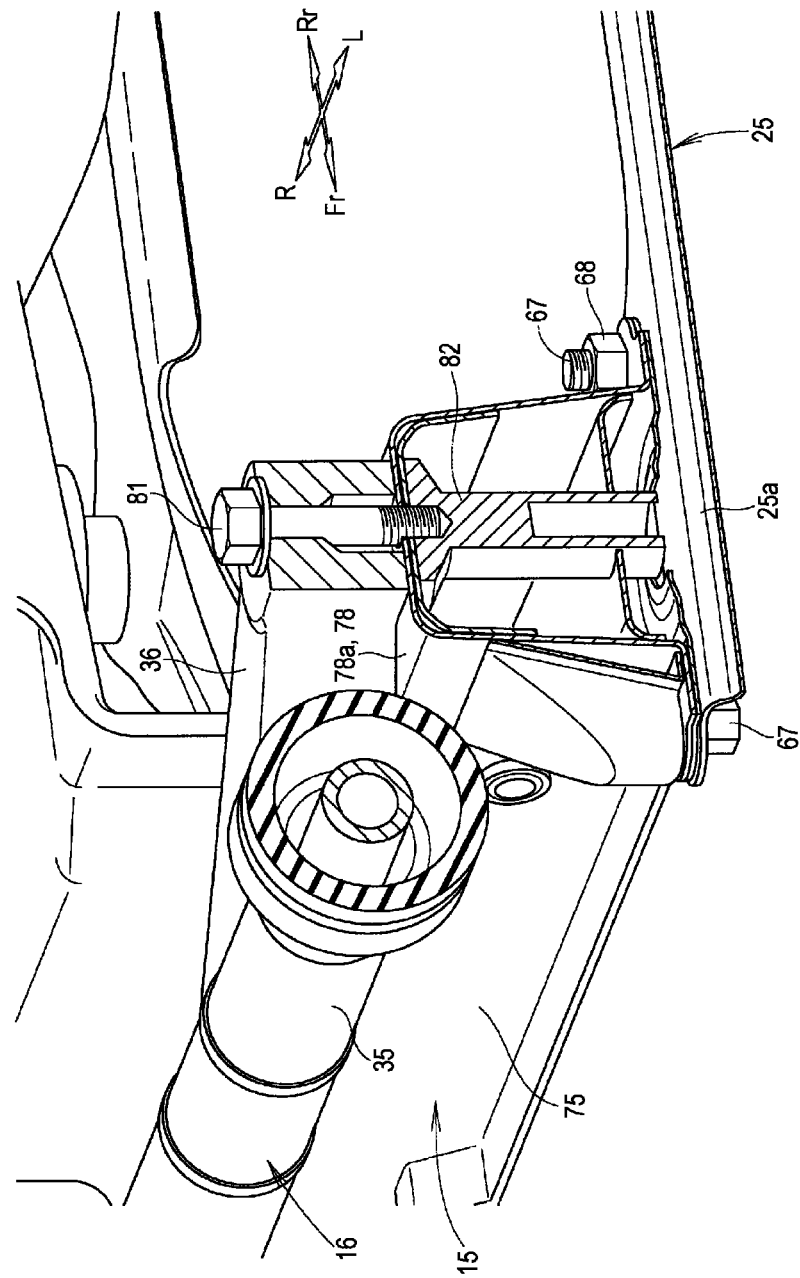
FIG. 8 is a sectional view taken along the line VIII-VIII in FIG. 7.

With the steering tube 35 disposed on the front side of the cross member 15, the left mounting bracket 36 is fastened to a left end 78a on the top 78 of the main member 75 with a bolt 81 and a nut 82 (see FIG. 8). As is the case for the left bracket 36, the right mounting bracket is fastened to the top 78 of the main member 75 with the bolt and nut. This process completes fastening of the steering tube 35 to the cross member 15.

As illustrated in FIG. 8, the left mounting bracket 36 is fastened to the left end 78a (on which the power steering unit 16 is mounted) on the top 78 of the main member 75 with the bolt 81 and nut 82. The left mounting portion 15a of the cross member 15 is located below the left end 78a on the top 78. The front end 25a of the left reinforcing member 25 is fastened to the left mounting portion 15a of the cross member 15 with the plurality of bolts 67 and nuts 68. Accordingly, the left end 78a (on which the power steering unit 16 is mounted) on the top 78 is reinforced by the front end 25a of the left reinforcing member 25. With this arrangement, the power steering unit 16 is tightly supported by the top 78 of the cross member 15.

As illustrated in FIG. 9, the cross member 15 and the left front side frame 12 are connected with each other with a left brace 85. Also, the cross member 15 and the right front side frame 13 are connected with each other with a left brace 86.

The left brace 85 is, for example, a steel plate extending linearly having a reinforcing folded piece formed at both edges thereof. Like the left brace 85, the right brace 86 is a steel plate extending linearly having a reinforcing folded piece formed at both edges thereof. The left brace 85 and the right brace 86 provided on the bottom of the vehicle body 11 reinforce the bottom of the vehicle body 11.

Specifically, a front end 86a of the right brace 86 is laid from below on a front end 85a of the left brace 85 at the breadthways center 15c on the bottom 37 of the cross member 15. The front end 85a of the left brace 85 and the front end 86a of the left brace 86 are fastened to each other with a bolt 88.

The left brace 85 extends obliquely rearward so as to be inclined toward the left outer side. The right brace 86 extends obliquely rearward so as to be inclined toward the right outer side. Accordingly, the left brace 85 and the right brace 86 diverge from the cross member 15 toward the rear of the vehicle substantially in a V-shape.

The left brace 85 is fastened at its center 85b to the bottom of the rear end 12c of the left front side frame 12 with a bolt 89 and is fastened at its rear end (not illustrated) to a left side sill 28. The right brace 86 is fastened at its center 86b to the bottom of the rear end 12c of the right front side frame 13 with a bolt 91 and is fastened at its rear end (not illustrated) to a right side sill 29. With this arrangement, the cross member 15, the left front side frame 12, and the right front side frame 13 are reinforced by the left brace 85 and the right brace 86.

The power steering unit 16 and the side support portions 44 of the right and left suspension arms 21 are supported by the cross member 15. In addition, the rear side support portions 47 of the right and left suspension arms 21 are supported by the right and left front side frames 12 and 13. Furthermore, the dash cross member 24 is mounted across the right and left front side frames 12 and 13.

Accordingly, the left brace 85 and the right brace 86 can improve the rigidity (so called "support rigidity") of the members that support the power steering unit 16 and other steering system components and the right and left suspension arms 21. With this arrangement, the power steering unit 16 and other steering system components and the right and left suspension arms 21 can be tightly supported by the vehicle body 11.

Figure 10A:
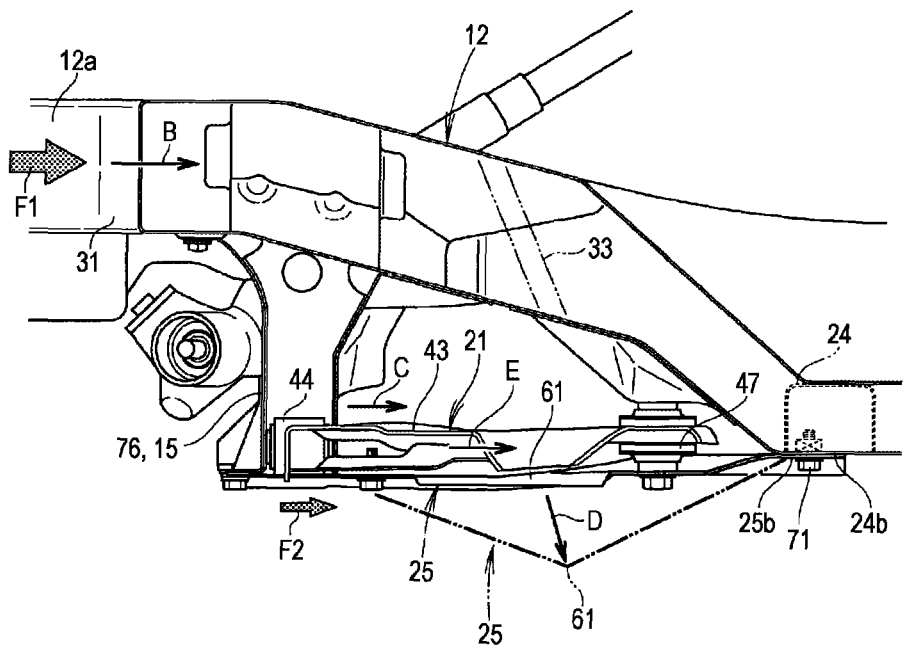
FIGS. 10A and 10B are explanatory diagrams explaining absorption of an impact load by a vehicle front structure according to the present application.

Next, the absorption of a frontal impact load by the vehicle front structure 10 according to the present application is described below with reference to FIGS. 10A and 10B. As illustrated in FIG. 10A, the frame bending section 33 is provided in the left front side frame 12, and the left reinforcing member 25 is disposed below the frame bending section 33. The left reinforcing member 25 is mounted across the cross member 15 and the dash cross member 24, and the bending section 61 is provided in the left reinforcing member 25.

When the vehicle body 11 (specifically, the front end 12a of the left front side frame 12) receives an impact load F1 coming from a vehicle front, the incoming impact load F1 causes the frame bending section 33 of the left front side frame 12 to be bent in the vehicle width direction. When the frame bending section 33 is bent, the front section 31 of the left front side frame 12 is moved rearward in the direction indicated by an arrow B.

At this time, the cross member 15, together with the front section 31 of the left front side frame 12, is moved rearward in the direction indicated by an arrow C. The front end 25a of the left reinforcing member 25 is fastened to the cross member 15. Accordingly, when the cross member 15 is moved rearward, a load F2 is applied to the front end 25a of the left reinforcing member 25. The incoming load F2 causes the left reinforcing member 25 to be bent at the bending section 61 around the bolt 71 (that fastens the rear end 25b of the left reinforcing member 25 to the left mounting portion 24b of the dash cross member 24) downward in the direction indicated by an arrow D, as illustrated by imaginary lines.

Since the left reinforcing member 25 is bent at the bending section 61, the left reinforcing member 25 is unlikely to suppress rearward bending of the left front side frame 12. Accordingly, the left front side frame 12 can be bent rearward in a preferred manner, thereby allowing the impact load F1 exerted on the front end 12a of the left front side frame 12 to be appropriately absorbed.

Figure 10B:
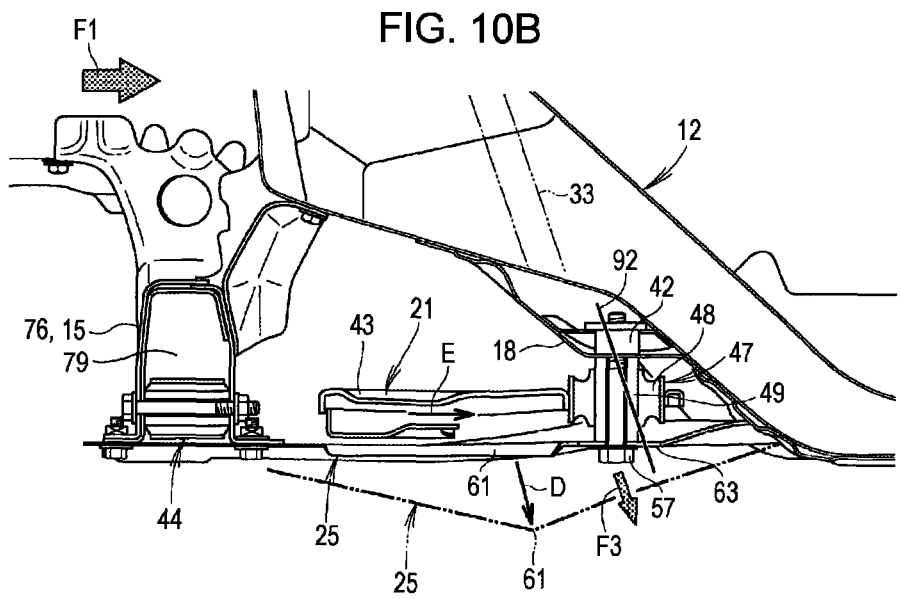

As illustrated in FIG. 10B, the rear support 63 of the left reinforcing member 25 is fastened to the rear side support portion 47 of the left suspension arm 21. Accordingly, since the bending section 61 in the left reinforcing member 25 is bent downward in the direction indicated by an arrow D, the left reinforcing member 25 exerts a downward and rearward load F3 on the rear side support portion 47.

The load F3 exerted on the rear side support portion 47 enables the left mount 18 attached to the rear side support portion 47 to be fractured or enables the rear side support portion 47 to be detached from the left mount 18. Accordingly, the left suspension arm 21 is unlikely to suppress rearward bending of the left front side frame 12, thereby allowing the impact load F1 exerted on the front end 12a (see FIG. 10A) of the left front side frame 12 to be absorbed in a more preferred manner.

The rear side support portion 47 of the left suspension arm 21 is supported at one side thereof by the left mount 18 so as to be tilt-adjustable through elastic deformation of the elastic portion 48 in the collar 49. In contrast, the front side support portion 44 of the left suspension arm 21 is housed in the space 79 of the left leg 76 in the cross member 15, thereby allowing the front side support portion 44 to be moved rearward together with the left leg 76.

As illustrated in FIG. 10A, when the impact load F1 exerted on the front end 12a of the left front side frame 12 causes the frame bending section 33 to be bent, the front side support portion 44 of the left suspension arm 21, together with the cross member 15, is moved rearward in the direction indicated by an arrow C. In conjunction with the movement of the front side support portion 44, the rigid main arm 43 is moved rearward in the direction indicated by an arrow E.

As illustrated in FIG. 10B, in conjunction with the movement of the main arm 43 in the direction indicated by an arrow E, the main arm 43 presses against the elastic portion 48 in the rear side support portion 47, causing the elastic portion 48 to push the collar 49 rearward in the direction indicated by an arrow E. The rear fastening bolt 57 in the rear side support portion 47 is supported at its thread (namely, upper end) by the left mount 18 with the rear fastening nut 42 therebetween.

Due to the elastic deformation of the elastic portion 48, the collar 49 becomes slanted to form a downward gradient toward the rear of the vehicle as indicated by a line 92. This facilitates the fracture or deformation of the left mount 18 fastened to the rear side support portion 47, thereby allowing the rear side support portion 47, together with the rear fastening nut 42, to be detached from the left mount 18 in a preferred manner. This process accelerates rearward bending of the left front side frame 12, thereby allowing the impact load F1 exerted on the front end 12a (see FIG. 10A) of the left front side frame 12 to be absorbed in a more preferred manner.

The bending section 61 is disposed frontward as compared to the rear side support portion 47. Accordingly, in conjunction with downward bending of the bending section 61 resulting from the impact load F1, the downward and rearward load F3 can be exerted on the rear side support portion 47 through the left reinforcing member 25 (specifically, the rear support 63) in a preferred manner. This enables the rear side support portion 47 to be detached from the left mount 18 in a preferred manner.

The vehicle front structure according to the present application is not limited to the embodiment described above, and modifications are conceivable within the scope of the present application. In the embodiment described above, the cross member 15 and the left front side frame 12, for example, are connected to each other with the left brace 85, and the cross member 15 and the right front side frame 13 are connected to each other with the right brace 86, but not limited to this.

The cross member 15 and the left end of the dash cross member 24, for example, may be connected to each other with the left brace 85, and the cross member 15 and the right end of the dash cross member 24 may be connected to each other with the right brace 86. As is the case with the above embodiment, this arrangement can improve the rigidity (so called "support rigidity") of the members that support the power steering unit 16 and other steering system components and the right and left suspension arms 21, thereby allowing various members to be tightly supported by the vehicle body 11.

In addition, a vehicle front structure, a vehicle body, right and left front side frames, a cross member, a power steering unit, a dash panel, right and left mounts, right and left suspension arms, a dash cross member, right and left reinforcing members, a frame bending section, a main arm, a front side support portion, a rear side support portion, an elastic portion, a collar, a bending section, a plate section, a rigid section, first and second bead sections, right and left legs, and right and left braces are not limited to those described in the above embodiment with regard to shape and configuration, and various modifications are conceivable.

The vehicle front structure according to the present application may be applied to a motor vehicle that has front side frames on right and left sides thereof and has suspension arms supported below the front side frames.

What is claimed is:
1. A vehicle front structure comprising:
   front side frames extending in a vehicle front-to-rear direction and provided on right and left sides of a vehicle body in a vehicle width direction, respectively, the front side frames having respective frame bendable sections that are bendable when the front side frames receive a frontal collision impact;
   a suspension arm having front and rear side support portions, above which one of the front bendable sections is located;

a cross member bridging between the front side frames, to which the front side support portion of the suspension arm is fastened;
a dash panel provided at a rear side of the cross member, the dash panel having a mount to which the rear side support portion of the suspension arm is fastened; and
a reinforcing member that is located below one of the frame bendable sections of the front side frames and that is extending in the vehicle front-to-rear direction and bridging between the cross member and the dash panel, the reinforcing member being fastened to the mount of the dash panel in a manner that supports the rear side support portion of the suspension arm,
wherein the reinforcing member has a bendable portion shaped so as to bend downward when receiving the frontal collision impact, and
wherein the suspension arm has an elastic member and a collar provided together at the rear fastening portion, the collar extending vertically, being coaxially provided in the elastic member and configured to receive a fastening component inserted through the collar from its bottom so as to fasten the elastic member and the collar to the mount of the dash panel.

2. The vehicle front structure according to claim 1, wherein the reinforcing member has a front end, a rear end, and a rigid section that extends between the front and rear ends in the vehicle front-to-rear direction, the rigid section being bendable downward at the bendable portion of the reinforcing member, and
wherein the reinforcing member supports the rear side support portion of the suspension arm at a location between the bendable portion and the rear end of the reinforcing member.

3. The vehicle front structure according to claim 1, wherein the cross member has a leg that extends upward to one of the front side frames and an opening opened in the vehicle width direction so as to house therein and support the front side support portion of the suspension arm, and
wherein the reinforcing member is fastened to the cross member on a vehicle inner side which is inner than the opening in the vehicle width direction.

4. The vehicle front structure according to claim 1, further comprising a dash cross member bridging the front side frames,
wherein the mount of the dash panel is provided to one of the front side frames, and the dash cross member is provided on a rear side of the mount in the vehicle front-to-rear direction; and
wherein a rear end of the reinforcing member is fastened to the dash cross member.

5. A vehicle front structure comprising:
front side frames extending in a vehicle front-to-rear direction and provided on right and left sides of a vehicle body in a vehicle width direction, respectively, the front side frames having respective frame bendable sections that are bendable when the front side frames receive a frontal collision impact;
a suspension arm having front and rear side support portions, above which one of the front bendable sections is located;
a cross member bridging between the front side frames, to which the front side support portion of the suspension arm is fastened;
a dash panel provided at a rear side of the cross member, the dash panel having a mount to which the rear side support portion of the suspension arm is fastened; and
a reinforcing member that is located below one of the frame bendable sections of the front side frames and that is extending in the vehicle front-to-rear direction and bridging between the cross member and the dash panel, the reinforcing member being fastened to the mount of the dash panel in a manner that supports the rear side support portion of the suspension arm,
wherein the reinforcing member has a bendable portion shaped so as to bend downward when receiving the frontal collision impact,
wherein the reinforcing member has a front end, a rear end, and a rigid section that extends between the front and rear ends in the vehicle front-to-rear direction, the rigid section being bendable downward at the bendable portion of the reinforcing member,
wherein the reinforcing member supports the rear side support portion of the suspension arm at a location between the bendable portion and the rear end of the reinforcing member,
wherein the reinforcing member has a substantially flat plate section formed in a belt shape and a bead section that extends downward from the plate section so as to form the rigid section, and
wherein the plate section is fastened to the rear side support portion of the suspension arm.

6. A vehicle front structure comprising:
front side frames extending in a vehicle front-to-rear direction and provided on right and left sides of a vehicle body in a vehicle width direction, respectively, the front side frames having respective frame bendable sections that are bendable when the front side frames receive a frontal collision impact;
a suspension arm having front and rear side support portions, above which one of the front bendable sections is located;
a cross member bridging between the front side frames, to which the front side support portion of the suspension arm is fastened;
a dash panel provided at a rear side of the cross member, the dash panel having a mount to which the rear side support portion of the suspension arm is fastened;
a reinforcing member that is located below one of the frame bendable sections of the front side frames and that is extending in the vehicle front-to-rear direction and bridging between the cross member and the dash panel, the reinforcing member being fastened to the mount of the dash panel in a manner that supports the rear side support portion of the suspension arm; and
a steering unit mounted above the cross member,
wherein the reinforcing member has a bendable portion shaped so as to bend downward when receiving the frontal collision impact, and
wherein the reinforcing member is fastened to the cross member at a location below the steering unit.

7. A vehicle front structure comprising:
front side frames extending in a vehicle front-to-rear direction and provided on right and left sides of a vehicle body in a vehicle width direction, respectively, the front side frames having respective frame bendable sections that are bendable when the front side frames receive a frontal collision impact;
a suspension arm having front and rear side support portions, above which one of the front bendable sections is located;
a cross member bridging between the front side frames, to which the front side support portion of the suspension arm is fastened;

a dash panel provided at a rear side of the cross member, the dash panel having a mount to which the rear side support portion of the suspension arm is fastened;

a reinforcing member that is located below one of the frame bendable sections of the front side frames and that is extending in the vehicle front-to-rear direction and bridging between the cross member and the dash panel, the reinforcing member being fastened to the mount of the dash panel in a manner that supports the rear side support portion of the suspension arm; and right and left braces extending substantially in a V-shape that diverges toward a rear side in the vehicle front-to-rear direction, wherein the reinforcing member has a bendable portion shaped so as to bend downward when receiving the frontal collision impact, and wherein each of the braces bridges and connects the cross member and one of the front side frames or bridges and connects the cross member and the dash cross member.

* * * * *